US010145477B2

(12) United States Patent
Tyers

(10) Patent No.: US 10,145,477 B2
(45) Date of Patent: Dec. 4, 2018

(54) VALVE ASSEMBLY

(71) Applicant: Intelligent Energy Limited, Loughborough (GB)

(72) Inventor: Gary Tyers, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/109,792

(22) PCT Filed: Jan. 6, 2015

(86) PCT No.: PCT/GB2015/050010
§ 371 (c)(1),
(2) Date: Jul. 5, 2016

(87) PCT Pub. No.: WO2015/104536
PCT Pub. Date: Jul. 16, 2015

(65) Prior Publication Data
US 2016/0327164 A1    Nov. 10, 2016

(30) Foreign Application Priority Data

Jan. 7, 2014 (GB) .................................. 1400210.9

(51) Int. Cl.
*F16K 1/36* (2006.01)
*F16K 1/12* (2006.01)
(Continued)

(52) U.S. Cl.
CPC ................ *F16K 1/36* (2013.01); *F16K 1/12* (2013.01); *F16K 1/46* (2013.01); *F17C 7/00* (2013.01); *F17C 13/04* (2013.01)

(58) Field of Classification Search
CPC ..... F16K 1/36; F16K 1/12; F16K 1/46; F17C 7/00; F17C 13/04
(Continued)

(56) References Cited

U.S. PATENT DOCUMENTS 4,316,600 A    2/1982 Parise et al.
6,244,572 B1*  6/2001 Delsole .................... F02M 5/12
                                                    141/364
(Continued)

FOREIGN PATENT DOCUMENTS

DE    10021997    11/2001
GB    2156213     10/1985
(Continued)

OTHER PUBLICATIONS

International Search Report and Written Opinion dated Oct. 4, 2015, in International Application No. PCT/GB2015/050010.
(Continued)

*Primary Examiner* — Kevin Murphy
*Assistant Examiner* — Kelsey Cary
(74) *Attorney, Agent, or Firm* — Baker & Hostetler LLP

(57) ABSTRACT

A valve assembly includes a valve stem having a resilient proximal seal member disposed around the stem and a distal seal member disposed around the stem. The proximal and distal seal members are axially separated from one another along the valve stem. The assembly further includes a housing defining a valve chamber, in which the valve stem is confined so as to be axially displaceable within the valve chamber. The housing defines a first portion of the valve chamber, in which the proximal seal member resides, a second portion of the valve chamber, in which the distal seal member resides, and a cross-bore chamber, which opens into the valve chamber in a third portion between the first and second portions. The third portion has a minimum cross-sectional diameter greater than the cross-sectional diameter of the first portion.

12 Claims, 4 Drawing Sheets

(51) Int. Cl.
  *F16K 1/46* (2006.01)
  *F17C 7/00* (2006.01)
  *F17C 13/04* (2006.01)

(58) Field of Classification Search
  USPC .......................................... 251/333, 321, 322
  See application file for complete search history.

(56) References Cited

U.S. PATENT DOCUMENTS

| | | | |
|---|---|---|---|
| 6,802,487 B2* | 10/2004 | Heun ........................ | F16K 3/34 |
| | | | 251/122 |
| 2001/0018929 A1* | 9/2001 | Taku ..................... | F16K 17/383 |
| | | | 137/505 |
| 2002/0008223 A1* | 1/2002 | Guerra .................. | F16K 5/0605 |
| | | | 251/315.01 |
| 2011/0266480 A1* | 11/2011 | Hawkes ................ | F16K 27/067 |
| | | | 251/315.1 |

FOREIGN PATENT DOCUMENTS

| | | |
|---|---|---|
| GB | 2471445 A | 12/2010 |
| JP | 3762809 | 4/2006 |
| WO | WO 2009/134873 A1 | 11/2009 |

OTHER PUBLICATIONS

Great Britain Patent Application No. 1400210.9; Search Report; dated Mar. 17, 2014; 4 pages.
International Patent Application No. PCT/GB2015/050010; Int'l Preliminary Report on Patentability; dated Jul. 12, 2016; 10 pages.

* cited by examiner

VALVE ASSEMBLY

CROSS-REFERENCE TO RELATED APPLICATIONS

This patent application is a U.S. National Stage patent application of International Patent Application PCT/GB2015/050010 filed Jan. 6, 2015, which claims priority to Great Britain Patent Application GB1400210.9 filed Jan. 7, 2014, the disclosures of which are incorporated by reference as if fully set forth herein.

FIELD OF THE INVENTION

The present invention relates to valve assemblies and in particular, though not exclusively, to poppet valves useful for the control of fluids passing through a valve chamber.

BACKGROUND OF THE INVENTION

In some types of valve assemblies, such as poppet valve assemblies, a valve stem may be axially displaceable within a valve chamber in order to open and close the valve. A particular valve assembly may also be configured to have a cross-bore traversing the valve chamber. At the point where the cross-bore breaks through or opens into the valve chamber, it may be found that sharp edges, burrs or other unwanted cutting/drilling/machining artefacts may remain present at the interface between the valve chamber and the cross-bore. Such artefacts (hereinafter generally referred to as "sharp edges") can be problematic, particularly during assembly of a valve. They may cause damage to softer parts of the valve assembly such as resilient (e.g. elastomeric) seals which traverse the cross-bore chamber during assembly or more generally during use. Such damage can be responsible for subsequent leaks in the valves, high re-work rates in assembly, or premature failure of the valve seals.

It is an object of the present invention to provide an improved valve design which reduces or eliminates risk of damage to softer components such as sealing elastomeric O-rings.

BRIEF SUMMARY OF THE INVENTION

According to one aspect, the invention provides a valve assembly comprising:
- a valve stem having a resilient proximal seal member disposed around the stem and a distal seal member disposed around the stem, the proximal and distal seal members being axially separated from one another along the valve stem;
- a housing defining a valve chamber in which the valve stem is confined so as to be axially displaceable within the valve chamber, the housing defining a first portion of the valve chamber in which the proximal seal member resides and a second portion of the valve chamber in which the distal seal member resides and further defining a cross-bore chamber which opens into the valve chamber in a third portion between the first and second portions;
- wherein the third portion has a minimum cross-sectional diameter greater than the cross-sectional diameter of the first portion.

The third portion of the valve chamber may have a minimum diameter equal to or larger than the uncompressed diameter of the proximal seal member. The first portion of the valve chamber may have a diameter smaller than an uncompressed diameter of the proximal seal member. The third portion of the valve chamber may entirely encompass the opening of the cross-bore chamber into the valve chamber. The second portion may define a valve seat for the distal seal member. The valve assembly may include a tapered edge between the first portion of the valve chamber and the third portion of the valve chamber. The valve assembly may include a transition portion of the valve chamber extending between the first portion and the third portion, the transition portion comprising a portion of decreasing diameter from the diameter of the third portion down to the diameter of the first portion. The proximal seal member may comprise an O-ring disposed around the valve stem. The proximal seal member may comprise two O-rings disposed around the valve stem, the O-rings being separated from one another along the valve stem. The valve stem may have a circumferential recess in which an O-ring is confined, the O-ring having an uncompressed outside diameter equal to or less than the diameter of the third portion of the valve chamber during installation of the valve stem into the valve chamber, the O-ring being compressed into the first portion of the valve chamber by the transition portion as the valve stem moves towards the first portion of the valve chamber. The valve seat may comprise a tapered section of the second portion of the valve chamber. The distal seal member may comprise an O-ring disposed around the valve stem and configured to seal against the tapered portion of the valve chamber when the valve stem is biased towards a proximal position. The valve seat may comprise a resilient seal member and the distal seal member of the valve stem may comprise a radially extending surface configured to engage with the resilient seal. The cross-bore chamber may traverse the valve chamber in the third portion.

According to another aspect, the invention provides a fuel cartridge comprising: a fuel chamber; an outlet; a valve assembly as described above disposed between the fuel chamber and the outlet, the valve assembly configured to enable release of fluid from the fuel chamber towards the outlet upon actuation of the valve stem.

BRIEF DESCRIPTION OF THE DRAWINGS

Embodiments of the present invention will now be described by way of example and with reference to the accompanying drawings in which.

DETAILED DESCRIPTION OF THE EMBODIMENTS

Figure 1:
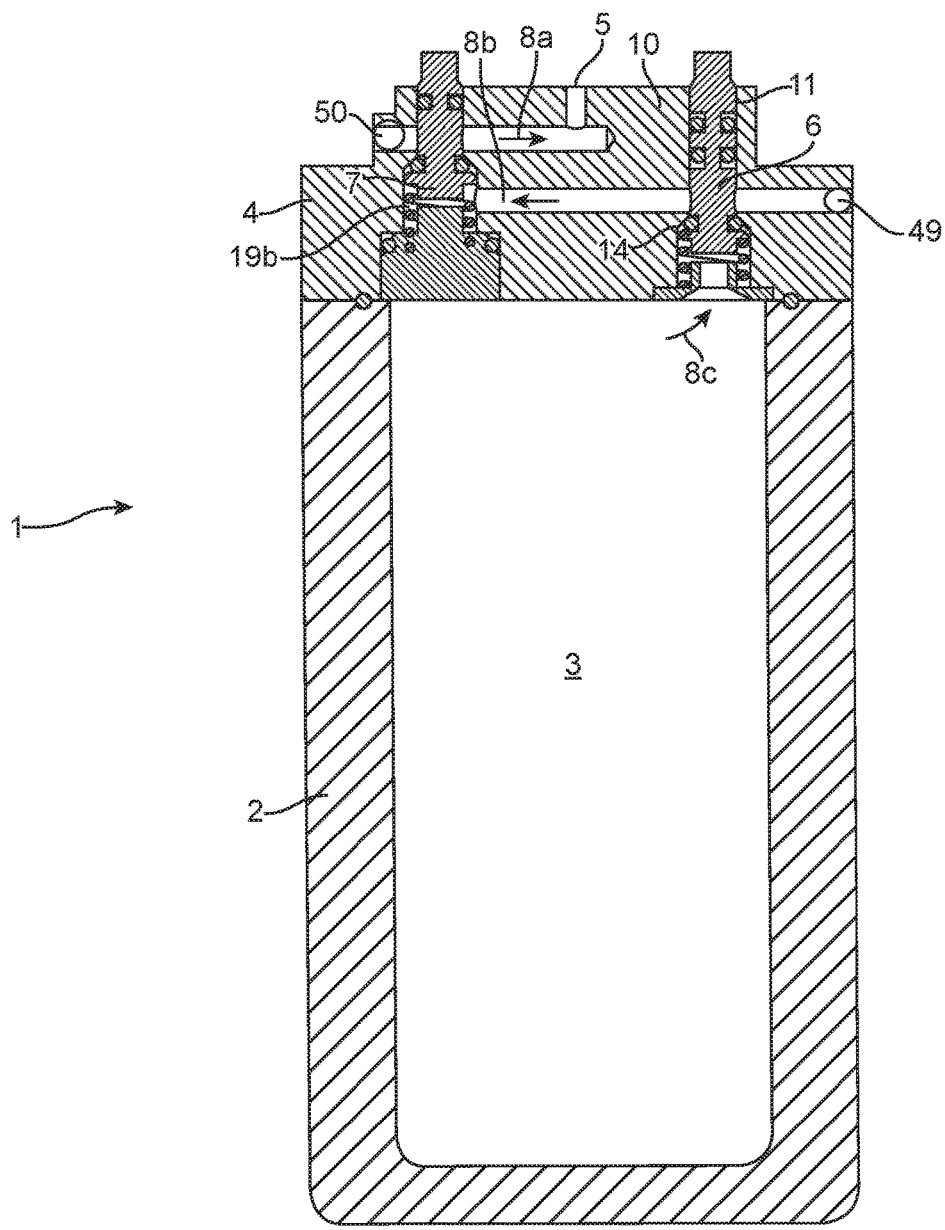
FIG. 1 shows a cross-sectional side view of a fuel cartridge, suitable for use as a hydrogen source for electrochemical fuel cells, incorporating a poppet valve assembly.

With reference to FIG. 1, a fuel cartridge 1 has a canister 2 defining a fuel reservoir 3 which is coupled to a head assembly 4. The head assembly 4 includes a fuel outlet 5 and a pair of valve assemblies 6, 7 disposed within a fluid path 8a, 8b, 8c extending from the reservoir 3 to the outlet 5.

Figure 2:
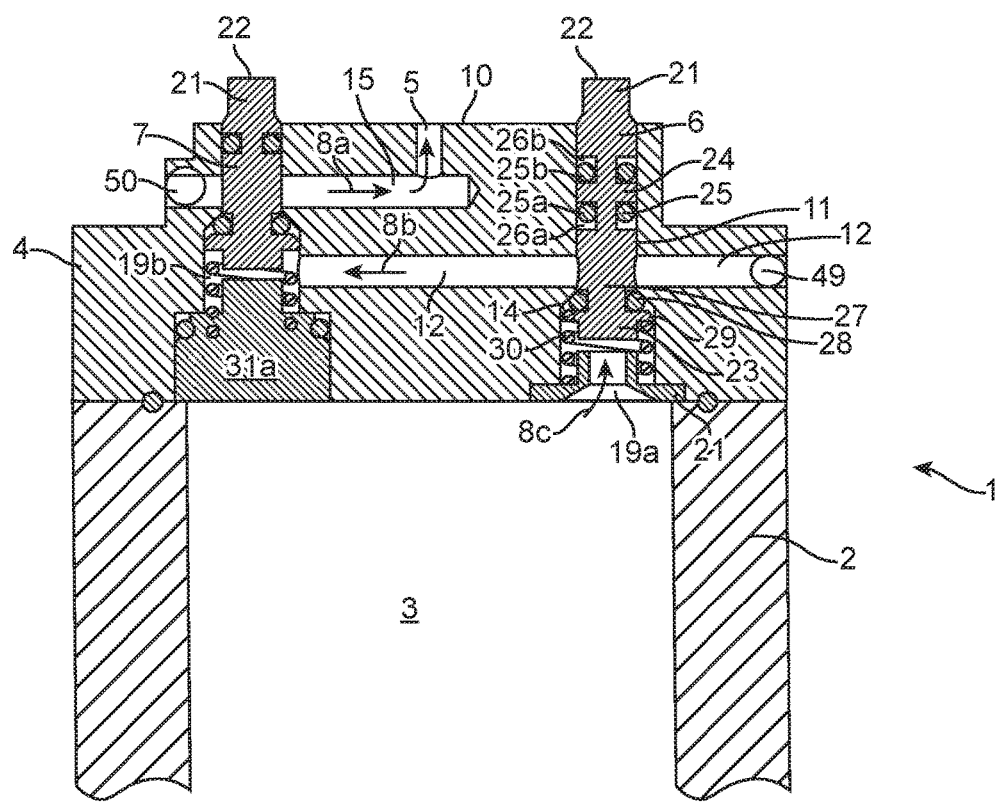
FIG. 2 shows a more detailed cross-sectional side view of the poppet valve assembly of FIG. 1.

FIG. 2 shows the head assembly 4 in greater detail. First valve assembly 6 comprises a valve stem 21 which extends from an actuation end 22 to a head end 23. In this example, the actuation end 22 may be regarded as a proximal end and the head end 23 may be regarded as a distal end, but this nomenclature is used for convenience and could be reversed.

The valve stem 21 includes a proximal portion 24 towards the proximal end 22, the proximal portion 24 having a resilient proximal seal 25. The proximal seal 25 may include one or more O-rings 25a, 25b each residing in a respective recess 26a, 26b. The recess(es) 26a, 26b may comprise any suitable retention feature such as a circumferential groove or channel in the valve stem 21, or spaces between upstanding features on the valve stem, which is/are capable of resisting displacement of the O-ring(s) axially along the valve stem.

The valve stem 21 further includes a distal portion 27 towards the distal (head) end 23, the distal portion having a distal seal member 28. The distal seal may include an O-ring around the valve stem which resides against a shoulder 29 to prevent axial displacement of the O-ring in the distal direction. It can be seen that the proximal and distal seals 25, 28 are axially separated from one another along the valve stem. The valve stem 21 is biased towards the proximal end 22 by a spring 30 held in place by a retaining head 31. The valve stem 21 can be axially displaced, against the spring bias, towards the distal end 23 by pressing downwards on the actuation end 22 where it emerges from the housing 10 of the head assembly 4.

The valve stem 21 resides in, and is axially displaceable within, the housing 10 which defines a valve chamber 11. The valve chamber 11 includes a radially-extending sealing surface 14 against which the distal seal member 28 can be biased. In the example shown, the radially-extending sealing surface 14 is oblique to the valve axis, e.g. provided as a tapered portion of the valve chamber 11. However, the radially extending sealing surface could also or alternatively comprise a step, e.g. a sealing surface orthogonal to the valve axis in the valve chamber wall. Either arrangement can serve as a valve seat.

The housing 10 also defines a cross-bore chamber 12 which traverses the valve chamber 11 at a position which is intermediate to the proximal and distal seals 25, 28. The cross-bore chamber 12 thereby defines two galleries communicating with and extending laterally from the valve chamber.

Further features of the valve assembly 6 will be discussed in connection with FIGS. 3 and 4. It will be evident from a study of the second valve assembly 7 also shown in FIGS. 1 and 2 that the second valve assembly 7 has very similar corresponding functional features to those described in connection with valve assembly 6 and is disposed longitudinally offset from the valve assembly 6 (e.g. higher, in FIGS. 1 and 2) so that it can serve as a second valve assembly in series with the first valve assembly by way of the cross-bore chamber 12 (flow path 8b). For this purpose, valve assembly 7 includes an extended retaining head 31a. Valve assembly 7 has its own cross-bore chamber 15 forming flow path section 8a. The valve arrangement of FIGS. 3 and 4 is relevant to the layout of both valve assembly 6 and valve assembly 7 but with corresponding features described in connection with the valve assembly 6.

Figure 3:
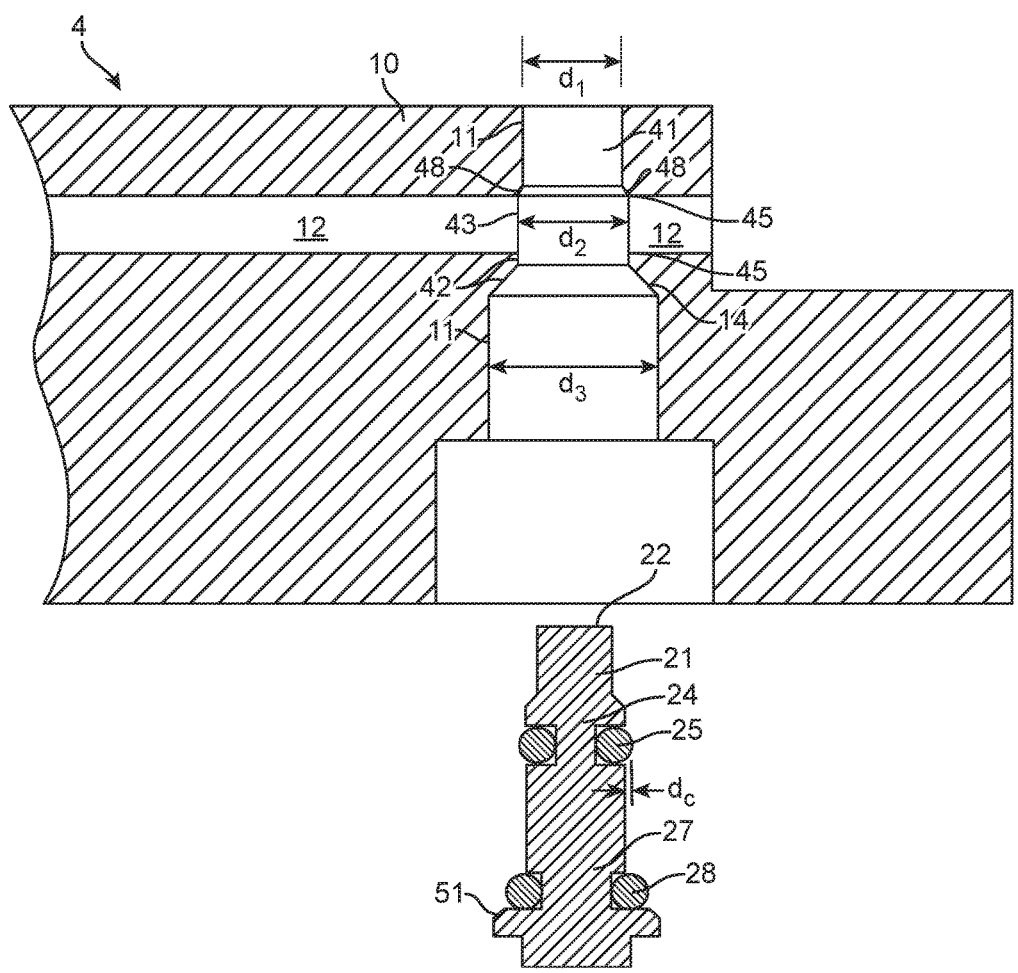
FIG. 3 shows a schematic cross-sectional side view of a valve chamber and valve stem prior to assembly.
Figure 4:
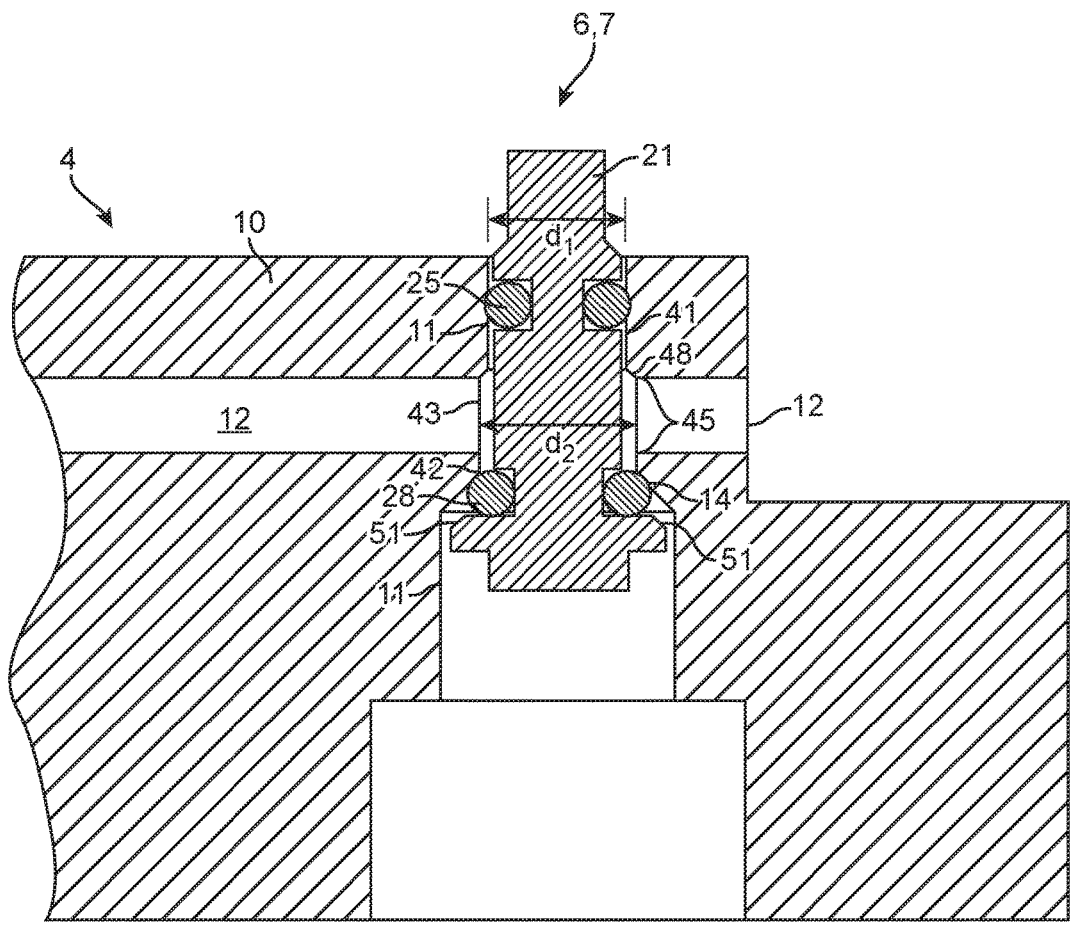
FIG. 4 shows a schematic cross-sectional side view of the valve chamber of FIG. 3 with the valve stem installed.

With reference to FIG. 3, the valve chamber 11 in the housing 10 of head assembly 4 is shown schematically in greater detail. The valve chamber 11 has a first portion 41 in which the proximal seal 25 will reside when the valve stem 21 is inserted and a second portion 42 in which the distal seal 28 will reside when the valve stem 21 is inserted. The cross-bore 12 traverses the valve chamber 11 in a third portion 43 between the first portion 41 and the second portion 42.

The cross-sectional diameter $d_1$ of the first portion 41 is sized to provide a sliding seal during axial motion of the valve stem 21 within the valve chamber 11 by sufficient compression of the proximal O-ring 25 to create the seal. Thus, the uncompressed resilient O-ring 25 extends radially outward from the circumferential surface of the valve stem 21 by a small amount $d_c$, giving a total uncompressed diameter of the O-ring 25 of $d_1+d_c$. The minimum cross-sectional diameter $d_2$ of the second portion 42 is sized to provide a sealing surface 14 for the distal O-ring 28 when it is biased in the axial direction towards the proximal end 22. The remaining parts of the second portion 42 may have a cross-sectional diameter $d_3$ at least large enough to receive the distal O-ring seal 28 but without effecting a full sealing engagement therewith. In other words, diameter $d_3$ is preferably larger than the uncompressed diameter of the distal O-ring seal 28.

An important aspect of the design shown in FIG. 3 is that the cross-sectional diameter of the valve chamber 11 at the third portion 43, where the cross-bore 12 intersects the valve chamber 11, should have a minimum cross-sectional diameter $d_2$ which is greater than the cross-sectional diameter $d_1$ of the first portion, and most preferably equal to or larger than the cross-sectional diameter of the uncompressed O-ring 25, i.e. greater than or equal to $d_1+d_c$.

Also as shown in FIG. 3, there may be a short transition region 48 between the first portion 41 of diameter $d_1$ and the third portion 43 of diameter $d_2$. This transition region 48 may be a simple bevel, chamfer or countersink, all of which may generally be encompassed by the expression a "tapered profile". These may be effected by the end profile of the drill bit which drills the third portion of the valve chamber 11 during manufacture of the head assembly 4. The tapered profile more generally provides an axial portion of the valve chamber 11 which has decreasing diameter from the diameter $d_2$ of the third portion 43 down to the diameter $d_1$ of the first portion, preferably with a smooth transition.

It has been found that during assembly of the valve by insertion of the valve stem 21 into the valve chamber 11, if both the first portion 41 and the third portion 43 of the valve chamber have equal cross-sectional diameter, although the valve stem 21 can be properly inserted into the chamber 11 under compression, there can be a tendency for the edges or corners 45 where the cross-bore 12 intersects through, or breaks into, the valve chamber 11 to cause scratches, striations, cuts or other damage to the O-rings 25. These sharp edges can cause sufficient damage to the O-rings 25 to result in undesirably high leak rates when the valve is in operation. This is particularly true where the contained fluid on reservoir 3 comprises small molecules such as hydrogen gas. Even where leak rates may be within acceptable limits (e.g. for safety), the improvement in performance of the O-ring seals 25 when they are not slid past the cross-bore 11 while under compression can generally improve the performance of a hydrogen fuel cartridge 1. This is particularly the case since such cartridges 1 are preferably required to be as small as possible with limited capacity and maximising hydrogen storage in the smallest possible volume for portability is important.

FIG. 4 shows the valve assembly 6, 7 with the valve stem 21 inserted in position within the valve chamber 11. The O-ring seal 25 has been compressed to diameter $d_1$ by passage through the transition region 48 and has had no, or negligible, contact with sharp edges 45 where the cross-bore 12 opens into the valve chamber 11. In this respect, it is optimal if the increased diameter $d_2$ of the third portion 43 extends at least as far as the extremes of the opening or openings of the cross-bore 12 into the valve chamber 11, along the valve axis. In other words, preferably the third portion of the valve chamber entirely encompasses the opening of the cross-bore chamber into the valve chamber.

Although the arrangement of FIGS. 1 to 4 shows the cross-bore chamber 12 as traversing the valve chamber 11, this may be for manufacturing convenience (e.g. so that the fluid path 8*b* or 8*a* can be drilled from an external surface of the head assembly, and plugged at the outside ends with seals 49, 50 (FIGS. 1 and 2). The cross-bore chamber 12 need not traverse the valve chamber—it may merely open into one side of the valve chamber 11, i.e. defining only a single gallery communicating with and extending laterally from the valve chamber 11. The described advantages of the increased diameter of the third portion 43 still apply. Although the cross-bore 12 is shown as orthogonal to the valve chamber 11, the cross-bore could more generally be oblique or transverse to the valve chamber, and benefits of the increased diameter of the third portion 43 can still be realised.

The valve assembly 6, 7 of FIGS. 1 to 4 provides the distal seal 28 by way of an O-ring 28 mounted on the valve stem 21 which compresses against the radial sealing surface 14. However, it will be understood that this arrangement can effectively be reversed, in which the valve stem 21 carries a non-compressible, radially-extending sealing surface (e.g. bevelled surface 51) and a compressible sealing surface (such as an O-ring) can be provided within the valve chamber 11. Thus, in a general aspect, the valve seat may comprise a resilient seal member and the distal seal member of the valve stem 21 may comprise a radially-extending surface which is configured to engage with the resilient seal.

In use, the fuel cartridge 1 provides a multi-valve arrangement for safe operation. Hydrogen gas can be released from the reservoir 3 by actuation of the valve stems 21 on both valve assemblies 6 and 7.

When valve stem 21 of valve assembly 6 is actuated by pressing on the actuation end 22 against the bias of spring 30, the O-ring 28 is displaced downward away from the radial sealing surface 14 thereby allowing fluid to flow from the valve cavity 19*a* and into the cross-bore 12. Fluid flows to the second valve assembly 7 via the cross-bore 12/flow path 8*b* to valve cavity 19*b*. Valve assembly 7 operates in a similar way by actuation of the valve stem 21 from the actuation end 22, allowing fluid to pass the distal seal and into cross-bore 15/fluid path 8*a*, and from there to outlet 5.

The valve assemblies 6, 7 have been described in relation to cross-sectional diameters of the first and third portions 41, 43 of the valve chamber 11. The cross-sectional diameter of the third portion 43 will be understood to refer to the diameter of the valve chamber as defined at positions other than the exact locations where the cross-bore 12 opens into the valve chamber 11, i.e. where the wall of the valve chamber is locally removed by the presence of the cross-bore. The opening of the cross-bore 12 into the valve chamber 11 will generally describe a somewhat elliptical aperture, i.e. a circular aperture that is curved out of the plane of the circle by intersection of the circular chamber of cross-bore 12 with a wall of chamber 11 that is itself curved.

In a general aspect, the third portion 43 of the valve chamber 11 provides a stepped bore for the valve chamber at the point of cross-drilling of the cross-bore 12 through the valve chamber, to provide a clearance fit for passage of the proximal valve seal 25 along the valve chamber 11 past the cross-bore.

Although the valve assembly has been described above specifically in the context of a fuel cartridge, the valve assembly described and claimed can be deployed in many other applications other than as a control valve in a fuel cartridge.

Other embodiments are intentionally within the scope of the accompanying claims.

The invention claimed is:

1. A hydrogen fuel cartridge comprising:
   a fuel chamber;
   an outlet;
   a first valve assembly disposed between the fuel chamber and the outlet, the first valve assembly comprising:
      a valve stem having a resilient proximal seal member disposed around the stem and a distal seal member disposed around the stem, the proximal and distal seal members being axially separated from one another along the valve stem;
      a housing defining a valve chamber in which the valve stem is confined so as to be axially displaceable within the valve chamber, the housing defining a first portion of the valve chamber in which the proximal seal member resides and a second portion of the valve chamber in which the distal seal member resides and further defining a cross-bore chamber which opens into the valve chamber in a third portion between the first and second portions;
   in which the second portion defines a valve seat configured to engage with the distal seal member;
   in which the valve seat comprises a resilient seal member, and the distal seal member of the valve stem comprises a radially extending surface configured to engage with the resilient seal member of the valve seat;
   a second valve assembly including a valve stem for actuation, the second valve assembly being disposed between the fuel chamber and the outlet;
   and
   a cross-bore chamber extending between the first valve assembly and the second valve assembly, the first and second valve assemblies together being configured to enable release of fluid from the fuel chamber towards the outlet via the first and second valve assemblies and the cross-bore chamber upon actuation of the valve stems of both the first and second valve assemblies,
   wherein the third portion has a minimum cross-sectional diameter greater than the cross-sectional diameter of the first portion.

2. The hydrogen fuel cartridge of claim 1, in which the third portion of the valve chamber has a minimum diameter equal to or larger than the uncompressed diameter of the proximal seal member.

3. The hydrogen fuel cartridge of claim 1, in which the first portion of the valve chamber has a diameter smaller than an uncompressed diameter of the proximal seal member.

4. The hydrogen fuel cartridge of claim 1, in which the third portion of the valve chamber entirely encompasses the opening of the cross-bore chamber into the valve chamber.

5. The hydrogen fuel cartridge of claim 1, further including a tapered edge between the first portion of the valve chamber and the third portion of the valve chamber.

6. The hydrogen fuel cartridge of claim 1, in which the cross-bore chamber traverses the valve chamber in the third portion.

7. The hydrogen fuel cartridge of claim 1, further including a transition portion of the valve chamber extending between the first portion and the third portion, the transition portion comprising a portion of decreasing diameter from the diameter of the third portion down to the diameter of the first portion.

8. The hydrogen fuel cartridge of claim 7, in which the valve stem has a circumferential recess in which an O-ring is confined, the O-ring having an uncompressed outside diameter equal to or less than the diameter of the third portion of the valve chamber during installation of the valve stem into the valve chamber, the O-ring being compressed into the first portion of the valve chamber by the transition portion as the valve stem moves towards the first portion of the valve chamber.

9. The hydrogen fuel cartridge of claim 1, in which the proximal seal member comprises an O-ring disposed around the valve stem.

10. The hydrogen fuel cartridge of claim 9, in which the proximal seal member comprises two O-rings disposed around the valve stem, the O-rings being separated from one another along the valve stem.

11. The hydrogen fuel cartridge of claim 1, in which the valve seat comprises a tapered section of the second portion of the valve chamber.

12. The hydrogen fuel cartridge of claim 11, in which the distal seal member comprises an O-ring disposed around the valve stem and configured to seal against the tapered portion of the valve chamber when the valve stem is biased towards a proximal position.

* * * * *